US012565573B2

(12) United States Patent
(10) Patent No.: US 12,565,573 B2
(45) Date of Patent: Mar. 3, 2026

Fini et al.

(54) BITUMEN COMPOSITES WITH IMPREGNATED ZEOLITES

(71) Applicants: Elham Fini, Phoenix, AZ (US); Dong-Kyun Seo, Chandler, AZ (US); Sand Aldagari, Tempe, AZ (US); Masoumeh Mousavi, Tempe, AZ (US)

(72) Inventors: Elham Fini, Phoenix, AZ (US); Dong-Kyun Seo, Chandler, AZ (US); Sand Aldagari, Tempe, AZ (US); Masoumeh Mousavi, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 297 days.

(21) Appl. No.: 18/450,535

(22) Filed: Aug. 16, 2023

(65) Prior Publication Data

US 2024/0084110 A1 Mar. 14, 2024

Related U.S. Application Data

(60) Provisional application No. 63/371,603, filed on Aug. 16, 2022.

(51) Int. Cl.

| | |
|---|---|
| ***C08K 9/12*** | (2006.01) |
| ***C01B 39/02*** | (2006.01) |
| ***C08J 3/20*** | (2006.01) |
| ***C08K 3/36*** | (2006.01) |
| ***C08L 95/00*** | (2006.01) |

(52) U.S. Cl.

CPC .............. *C08K 9/12* (2013.01); *C01B 39/026* (2013.01); *C08J 3/203* (2013.01); *C08K 3/36* (2013.01); *C08L 95/00* (2013.01); *C08J 2395/00* (2013.01); *C08L 2555/60* (2013.01)

(58) Field of Classification Search

CPC ... C08K 9/12; C08K 3/36; C08K 3/34; C08K 3/346; C01B 39/026; C08J 3/203; C08J 2395/00; C08L 95/00; C08L 2555/60

See application file for complete search history.

(56) References Cited

U.S. PATENT DOCUMENTS

| | | | |
|---|---|---|---|
| 3,723,308 A | 3/1973 | Breck | |
| 6,229,032 B1 | 5/2001 | Jacobs | |
| 10,829,382 B2 | 11/2020 | Seo | |
| 11,186,490 B2 | 11/2021 | Seo | |
| 2007/0227351 A1 | 10/2007 | Garcia-Martinez | |

(Continued)

FOREIGN PATENT DOCUMENTS

WO 2022266594 12/2022

OTHER PUBLICATIONS

Direct Air Capture on Amine Impregnated FAU zeolites Exploring for high adsorption capaticty and a low temperature Rajesh Kumar Syhohei Ohtani and Nao Tsunoji Microporous and Mesoporuous Materials 360 (2023) 112714 (Year: 2023).*

(Continued)

*Primary Examiner* — Pamela H Weiss

(74) *Attorney, Agent, or Firm* — Fish & Richardson P.C.

(57) ABSTRACT

A bitumen composite includes an amine-impregnated zeolite and bitumen. Forming the bitumen composite includes combining bitumen and an amine-impregnated zeolite to yield a mixture, heating the mixture to yield the bitumen composite.

23 Claims, 8 Drawing Sheets

(56) References Cited

U.S. PATENT DOCUMENTS

| | | | | |
|---|---|---|---|---|
| 2012/0180702 A1* | 7/2012 | Ribeiro | C04B 38/08 106/668 |
| 2017/0030077 A1 | 2/2017 | Wang | |
| 2021/0309858 A1 | 10/2021 | Seo et al. | |
| 2023/0219846 A1 | 7/2023 | Fini | |

OTHER PUBLICATIONS

Reducing the Carbon Footprint of Bituminous composite Amin Impregnated Zeolite Masoumeh Mousavi Sand Aldagari Don Kyun Seo and Elham Fini ACS Sustainable Chem Eng (2022) 10, 13004-13016 (Year: 2022).*

Synthesis of Amino Impregnated ZIF-8 for CO.sub.2 Adsorption International Reasearch and Innovation Summit (IRIS2017) IOOP Conf Series Materials Science and Engineering 226 (2017) 012164 Nur Haffza binti Yahya Yin Fong Yeong Li Sze Lai (Year: 2017).*

Technoeconomic Investigation of Amine Grafter Zeolites and their Kinetics for CO.sub.2 captuer by Vijaya Tejavath Viswateja Kassarabada Spandana Gonuguntla Vjayanand Perupoga Stayanarayana V Nandury Sreedhar Bojja and Ujjwal Pal ACE Omega (2021) 6, 6153-6162 (Year: 2021).*

Banerjee, Rahul, et al. "High-throughput synthesis of zeolitic imidazolate frameworks and application to CO2 capture." Science 319.5865 (2008): 939-943.

Buddhala, Aravinda, et al. "Effects of an amine anti-stripping agent on moisture susceptibility of sasobit and aspha-min mixes by surface free energy analysis." Journal of Testing and Evaluation 40.1 (2012): 91-99.

Camper, Dean, et al. "Room-temperature ionic liquid-amine solutions: tunable solvents for efficient and reversible capture of CO2." Industrial & Engineering Chemistry Research 47.21 (2008): 8496-8498.

Campo, Francesco Pietro, et al. "Natural and enhanced carbonation of lime in its different applications: a review." Environmental Technology Reviews 10.1 (2021): 224-237.

Chauhan, Dheeraj Singh, et al. "Design and synthesis of a novel corrosion inhibitor embedded with quaternary ammonium, amide and amine motifs for protection of carbon steel in 1 M HCI." Journal of Molecular Liquids 317 (2020): 113917, pp. 1-14.

Cheng, Huaigang, et al. "Experimental investigation of CO2 adsorption and desorption on multi-type amines loaded HZSM-5 zeolites." Chemical Engineering Journal 406 (2021): 126882, pp. 1-11.

Clark, Stewart J., et al. "First principles methods using CASTEP." Zeitschrift für kristallographie-crystalline materials 220.5-6 (2005): 567-570.

Combariza, Aldo F., and German Sastre. "Influence of zeolite surface in the sorption of methane from molecular dynamics." The Journal of Physical Chemistry C 115.28 (2011): 13751-13758.

Crabtree, Jennifer C., et al. "Simulation of the Adsorption and Transport of CO2 on Faujasite Surfaces." The Journal of Physical Chemistry C 117.42 (2013): 21778-21787.

Davidovits, Joseph. "Properties of geopolymer cements." First international conference on alkaline cements and concretes. vol. 1. 1994, pp. 1-19.

Delley, Bernard. "An all-electron numerical method for solving the local density functional for polyatomic molecules." The Journal of chemical physics 92.1 (1990): 508-517.

Fijalkowski, Krzysztof, et al. "The presence of contaminations in sewage sludge—The current situation." Journal of environmental management 203 (2017): 1126-1136.

Fini, Elham H., et al. "Active mineral fillers arrest migrations of alkane acids to the interface of bitumen and siliceous surfaces." ACS Sustainable Chemistry & Engineering 7.12 (2019): 10340-10348.

Frising, T., and P. Leflaive. "Extraframework cation distributions in X and Y faujasite zeolites: A review." Microporous and Mesoporous materials 114.1-3 (2008): 27-63.

Garcia, Cristina L., and Johannes A. Lercher. "Adsorption and surface reactions of thiophene on ZSM 5 zeolites." The Journal of Physical Chemistry 96.6 (1992): 2669-2675.

Garcia-Martínez, Javier, et al. "Mesostructured zeolite Y-high hydrothermal stability and superior FCC catalytic performance." Catalysis Science & Technology 2.5 (2012): 987-994.

Grimme, Stefan. "Density functional theory with London dispersion corrections." Wiley Interdisciplinary Reviews: Computational Molecular Science 1.2 (2011): 211-228.

Hesami, Saeid, et al. "Evaluate the mechanism of the effect of hydrated lime on moisture damage of warm mix asphalt." Construction and Building Materials 47 (2013): 935-941.

Hesami, Ebrahim, and Gholamreza Mehdizadeh. "Study of the amine-based liquid anti-stripping agents by simulating hot mix asphalt plant production process." Construction and Building Materials 157 (2017): 1011-1017.

Hung, Albert M., et al. "Preventing assembly and crystallization of alkane acids at the silica-bitumen interface to enhance interfacial resistance to moisture damage." Industrial & Engineering Chemistry Research 58.47 (2019): 21542-21552.

Hung, Albert, and Elham H. Fini. "Surface morphology and chemical mapping of UV-aged thin films of bitumen." ACS Sustainable Chemistry & Engineering 8.31 (2020): 11764-11771.

Kabir, Sk Faisal, et al. "End of life plastics to enhance sustainability of pavement construction utilizing a hybrid treatment of bio-oil and carbon coating." Construction and Building Materials 278 (2021): 122444, pp. 1-12.

Karakurt, Cenk, Haldun Kurama, and Ilker Bekir Topcu. "Utilization of natural zeolite in aerated concrete production." Cement and Concrete Composites 32.1 (2010): 1-8.

Kennedy, Thomas W., Freddy L. Roberts, and Kang W. Lee. Evaluation of moisture effects on asphalt concrete mixtures. No. 911. 1983, 134-143.

Khare, Peeyush, et al. "Asphalt-related emissions are a major missing nontraditional source of secondary organic aerosol precursors." Science advances 6.36 (2020): eabb9785, pp. 1-14.

Kim, Chaehoon, et al. "An ethylenediamine-grafted Y zeolite: a highly regenerable carbon dioxide adsorbent via temperature swing adsorption without urea formation." Energy & Environmental Science 9.5 (2016): 1803-1811.

Kriech, Anthony J., et al. "Assessing cancer hazards of bitumen emissions—a case study for complex petroleum substances." Critical Reviews in Toxicology 48.2 (2018): 121-142.

Kuenen, J., et al. "EMEP/EEA emission inventory guidebook 2009." European Environment Agency: Copenhagen, Denmark 18 (2009), pp. 1-19.

Kumar, Santosh, Rohit Srivastava, and Joonseok Koh. "Utilization of zeolites as CO2 capturing agents: Advances and future perspectives." Journal of CO2 Utilization 41 (2020): 101251, pp. 1-16.

Lepaumier, Helene, Dominique Picq, and Pierre-Louis Carrette. "New amines for CO2 capture. I. Mechanisms of amine degradation in the presence of CO2." Industrial & Engineering Chemistry Research 48.20 (2009): 9061-9067.

Li, Bingrui, et al. "A theoretical investigation into the thiophene-cracking mechanism over pure Brønsted acidic zeolites." Journal of Catalysis 253.1 (2008): 212-220.

Lu, Xiaohu, and Ulf Isacsson. "Chemical and rheological evaluation of ageing properties of SBS polymer modified bitumens." Fuel 77.9-10 (1998): 961-972.

Lucas Junior, Jorge LO, et al. "Evaluating the effect of amine-based anti-stripping agent on the fatigue life of asphalt pavements." International Journal of Pavement Engineering 23.8 (2022): 2785-2795.

Malinowski, Szymon, Michał Wróbel, and Agnieszka Woszuk. "Quantum chemical analysis of the corrosion inhibition potential by aliphatic amines." Materials 14.20 (2021): 6197, pp. 1-23.

Martens, Johan A., et al. "Selective isomerization of hydrocarbon chains on external surfaces of zeolite crystals." Angewandte Chemie International Edition in English 34.22 (1995): 2528-2530.

McCann, Martin, and Peter E. Sebaaly. "Evaluation of moisture sensitivity and performance of lime in hot-mix asphalt: Resilient modulus, tensile strength, and simple shear tests." Transportation Research Record 1832.1 (2003): 9-16.

(56) References Cited

OTHER PUBLICATIONS

McCusker, L. B., F. Liebau, and G. Engelhardt. "Nomenclature of structural and compositional characteristics of ordered microporous and mesoporous materials with inorganic hosts (IUPAC Recommendations 2001)." Pure and Applied Chemistry 73.2 (2001): 381-394.
McCusker, Lynne B., and Christian Baerlocher. "Zeolite structures." Studies in surface science and catalysis. vol. 137. Elsevier, 2001. 37-67.
Mirwald, Johannes, et al. "Impact of UV-Vis light on the oxidation of bitumen in correlation to solar spectral irradiance data." Construction and Building Materials 316 (2022): 125816, pp. 1-13.
Mizukami, Koichi, et al. "Molecular dynamics studies of surface difference effect on gas separation by zeolite membranes." Japanese Journal of Applied Physics 39.7S (2000): 4385-4388.
Mousavi, M., Martis, V., & Fini, E. H. (2021). Inherently functionalized carbon from algae to adsorb precursors of secondary organic aerosols in noncombustion sources. ACS Sustainable Chemistry & Engineering, 9(43), 14375-14384.
Mousavi, Masoumeh, and Elham H. Fini. "Preventing emissions of hazardous organic compounds from bituminous composites." Journal of Cleaner Production 344 (2022): 131067, pp. 1-10.
Newsam, J. M. "The zeolite cage structure." Science 231.4742 (1986): 1093-1099.
Oldham, Daniel J., et al. "A bottom-up approach to study the moisture susceptibility of bio-modified asphalt." Construction and Building Materials 265 (2020): 120289. 10 pages.
Oldham, Daniel. Implications of bio-modification on moisture damage mechanisms in asphalt binder matrix. Diss. Arizona State University, 2020, pp. 1-215.
Oldham, Daniel, et al. "Reducing susceptibility to moisture damage in asphalt pavements using polyethylene terephthalate and sodium montmorillonite clay." Construction and Building Materials 269 (2021): 121302. 12 pages.
Oldham, Daniel J., Pouria Hajikarimi, and Elham H. Fini. "Introducing a New Test to Examine Moisture Susceptibility at the Interface of Bitumen and Stones." Journal of Transportation Engineering, Part B: Pavements 148.2 (2022): 04022029, pp. 1-7.
Park, Dae-Wook, et al. "Evaluation of moisture susceptibility of asphalt mixture using liquid anti-stripping agents." Construction and Building Materials 144 (2017): 399-405.
Payne, M.C., et al. "Iterative minimization techniques for ab initio total-energy calculations: molecular dynamics and conjugate gradients." Reviews of modern physics 64.4 (1992): 1045-1097.
Perdew, John P., Kieron Burke, and Matthias Ernzerhof. "Generalized gradient approximation made simple." Physical review letters 77.18 (1996): 3865-3868.
Porcher, Florence, et al. "The crystal structure of a low-silica dehydrated NaX zeolite." Eur. J. Mineral, (1999), 333-343.
Rajib, Amirul Islam, Saba Shariati, and Elham H. Fini. "The effect of progressive aging on the bond strength of bitumen to siliceous stones." Applied Surface Science 550 (2021): 149324, pp. 1-9.
Rihan, Rihan, Reyad Shawabkeh, and Nawaf Al-Bakr. "The effect of two amine-based corrosion inhibitors in improving the corrosion resistance of carbon steel in sea water." Journal of Materials Engineering and performance 23 (2014): 693-699.
Ripple, William J., et al. "World scientists' warning of a climate emergency." BioScience 70.1 (2020): 8-100.
Rochelle, Gary T. "Amine scrubbing for CO2 capture." Science 325.5948 (2009): 1652-1654.
Rozanska, Xavier, Rutger A. van Santen, and François Hutschka. "A DFT study of the cracking reaction of thiophene activated by small zeolitic clusters." Journal of Catalysis 200.1 (2001): 79-90.
Rozanska, Xavier, et al. "A periodic density functional theory study of thiophenic derivative cracking catalyzed by mordenite." Journal of Catalysis 215.1 (2003): 20-29.
Sebaaly, Peter E., Dallas N. Little, and Jon A. Epps. The benefits of hydrated lime in hot mix asphalt. 2006, pp. 1-80.
Slater, B., et al. "Atomistic simulation of zeolite surfaces." Current Opinion in Solid State and Materials Science 5.5 (2001): 417-424.
Sollazzo, Giuseppe, et al. "Impact analysis using life cycle assessment of asphalt production from primary data." Sustainability 12.24 (2020): 10171, pp. 1-21.
Stuckert, Amy Nicki, and Ralph T. Yang. "CO2 capture from the atmosphere and simultaneous concentration using zeolites and amine-grafted SBA-15." Environmental science & technology 45.23 (2011): 10257-10264.
Swaminathan, R., and S. Nadhipite. "Design of Solar Lime Kiln." Innov Ener Res S 1 (2017): 2576-1463.
Tayebali, Akhtarhusein A., Detlef RU Knappe, and Venkata Lakshman Mandapaka. Effect of prolonged heating on the asphalt-aggregate bond strength of HMA containing liquid anti-strip additives. No. FHWA/NC/2007-08. North Carolina State University. Dept. of Civil, Construction, and Environmental Engineering, 2008, pp. 1-109.
Tejavath, Vijaya, et al. "Technoeconomic investigation of amine-grafted zeolites and their kinetics for CO2 capture." ACS omega 6.9 (2021): 6153-6162.
Ash, Soda. Mineral commodity summaries 2019. Reston, VA: US Geological Survey, 2019, pp. 1-204.
Van Dam, Thomas J., et al. Towards sustainable pavement systems: a reference document. No. FHWA-HIF-15-002. United States. Federal Highway Administration, 2015, pp. 1-458.
Watson, Donald, et al. "Effectiveness of antistrip agents in asphalt mixtures." Transportation research record 2370.1 (2013): 128-136.
Welters, W. J. J., V. H. J. De Beer, and R. A. Van Santen. "Influence of zeolite acidity on thiophene hydrodesulfurization activity." Applied Catalysis A: General 119.2 (1994): 253-269.
Wilson, Sean MW, and F. Handan Tezel. "Direct dry air capture of CO2 using VTSA with faujasite zeolites." Industrial & Engineering Chemistry Research 59.18 (2020): 8783-8794.
Woszuk, Agnieszka, and Wojciech Franus. "A review of the application of zeolite materials in warm mix asphalt technologies." Applied Sciences 7.3 (2017): 293, pp. 1-15.
Woszuk, Agnieszka. "Application of fly ash derived zeolites in warm-mix asphalt technology." Materials 11.9 (2018): 1542, pp. 1-13.
Woszuk, Agnieszka, Michał Wróbel, and Wojciech Franus. "Application of zeolite tuffs as mineral filler in warm mix asphalt." Materials 13.1 (2019): 19, pp. 1-12.
Yan, Xingbin, et al. "Chemical functionalization, self-assembly, and applications of nanomaterials and nanocomposites 2014." Journal of Nanomaterials 2015 (2015): 9-9, 1 page.
Ye, Yali, et al. "Evaluation on improvement effect of different anti-stripping agents on pavement performance of granite-asphalt mixture." Materials 15.3 (2022): 915, pp. 1-21.
Zhenyan, Liu, Lu Yunzhuang, and Zhao Jiaxin. "Zeolite-active carbon compound adsorbent and its use in adsorption solar cooling tube." Solar Energy Materials and solar cells 52.1-2 (1998): 45-53.
Zimmermann, Nils ER,. "On the effects of the external surface on the equilibrium transport in zeolite crystals." The Journal of Physical Chemistry C 114.1 (2010): 300-310.
Zimmermann, Nils ER, Berend Smit, and Frerich J. Keil. "Predicting local transport coefficients at solid-gas interfaces." The Journal of Physical Chemistry C 116.35 (2012): 18878-18883.
Zou, Fuliao, et al. "Performance of zeolite synthesized from sewage sludge ash as a warm mix asphalt additive." Resources, Conservation and Recycling 181 (2022): 106254, pp. 1-9.
Zu, Mei, et al. "Daytime passive radiative cooler using zeolite." Journal of Porous Materials 29.1 (2022): pp. 1-8.
David Worford, Environment and Energy Leader, Feb. 3, 2022, 7 pages.
AASHTO T 350-14, "Standard Method of Test for Multiple Stress Creep Recovery (MSCR) Test of Asphalt Binder Using a Dynamic Shear Rheometer (DSR)," American Association of State and Highway Transportation Officials, 2014, 7 pages.
Ackley et al., "Application of natural zeolites in the purification and separation of gases," Microporous and Mesoporous Materials, 2003, 61(1-3):25-42.
Alvarez-Ayuso et al., "Purification of metal electroplating waste waters using zeolites," Water Research, 2003, 37 (20):4855-4862.

(56) References Cited

OTHER PUBLICATIONS

ASTM D4402/D4402M-15, "Standard Test Method for Viscosity Determination of Asphalt at Elevated Temperatures Using a Rotational Viscometer," ASTM International, 2015, 4 pages.
ASTM D6373-16, "Standard Specification for Performance Graded Asphalt Binder," ASTM International, 2016, 6 pages.
ASTM D6648-08, "Standard Test Method for Determining the Flexural Creep Stiffness of Asphalt Binder Using the Bending Beam Rheometer (BBR)," ASTM International, 2016, 15 pages.
ASTM E1269-11, "Standard Test Method for Determining Specific Heat Capacity by Differential Scanning Calorimetry," ASTM International, 2018, 6 pages.
Baumgardner, G. L.; Masson, J. F.; Hardee, J.; Menapace, A. M.; Williams, A. G.; Kluttz, R.; Dunning, R.; Scherocman, J.; Puzinauskas, V.; Reinke, G.; Martin, J. V.; Arnold, T.; Kennepohl, G., Polyphosphoric acid modified asphalt: Proposed mechanisms. Asphalt Paving Technology: Association of Asphalt Paving Technologists—Proceedings of the Technical Sessions 2005, 74, 283-305.
Bellussi et al., "Industrial applications of zeolite catalysis: production and uses of light olefins," Studies in Surface Science and Catalysis, 2005, 158:1201-1212.
Blum, P.; Sagner, A.; Tiehm, A.; Martus, P.; Wendel, T.; Grathwohl, P., Importance of heterocylic aromatic compounds in monitored natural attenuation for coal tar contaminated aquifers: A review. Journal of Contaminant Hydrology 2011, 126 (3), 181-194.
Boczkaj, G.; Kamiński, M., Research on the separation properties of empty-column gas chromatography (EC-GC) and conditions for simulated distillation (SIMDIS). Analytical and Bioanalytical Chemistry 2013, 405 (25), 8377-8382.
Bonenfant et al., "Advances in principal factors influencing carbon dioxide adsorption on zeolites," Sci. Technol. Adv. Mater., 2008, 9(1):013007, 8 pages.
Canestrari et al., "Rheological properties of bituminous binders with synthetic wax," International Journal of Pavement Research and Technology, 2013, 6(1):15-21.
Capitão et al., "Pavement engineering materials: Review on the use of warm-mix asphalt," Construction and Building Materials, 2012, 36:1016-1024.
Castaldi et al., "Sorption processes and XRD analysis of a natural zeolite exchanged with Pb2+, Cd2+ and Zn2+ cations," Journal of Hazardous Materials, 2008, 156(1-3):428-434.
Chen et al., "Silver-Ion-Exchanged Nanostructured Zeolite X as Antibacterial Agent with Superior lon Release Kinetics and Efficacy against Methicillin-Resistant *Staphylococcus aureus*," ACS Appl. Mater. Interface, 2017, 9 (45):39271-39282.
Chen et al., "Template-free synthesis and structural evolution of discrete hydroxycancrinite zeolite nanorods from high-concentration hydrogels," Nanoscale, 2017, 9(47):18804-18811.
Chhabra, "Non-Newtonian fluids: an introduction," Rheology of Complex Fluids, 2010, 33 pages.
Choi et al., "Stable single-unit-cell nanosheets of zeolite MFI as active and long-lived catalysts," Nature, 2009, 461 (7261):246-250.
Chung et al., "Removal of free fatty acid in waste frying oil by esterification with methanol on zeolite catalysts," Bioresource Technology, 2008, 99(16):7438-7443.
Corbett, L. W., Reaction Variables in the Air Blowing of Asphalt. Industrial & Engineering Chemistry Process Design and Development 1975, 14, 181-187.
Croteau et al., "Warm mix asphalt paving technologies: a road builder's perspective," Proc., Annual Conference of the Transportation Association of Canada, 2008, 12 pages.
Davie, F. M.; Mores, S.; Nolan, P. F.; Hoban, T. W. S., Evidence of the oxidation of deposits in heated bitumen storage tanks. Journal of Loss Prevention in the Process Industries 1993, 6 (3), 145-150.
Davis, "New perspectives on basic zeolites as catalysts and catalyst supports," Journal of Catalysis, 2003, 216 (1-2):396-405.
Delley, B., From Molecules to Solids With the DMol3 Approach. The Journal of Chemical Physics 2000, 113, 7756-7764.
Department of Health and Human Services, Health Effects of Occupational Exposure to Asphalt. NIOSH Publication No. 2001-110, 2000, 150 pages.
Deygout, F., Volatile emissions from hot bitumen storage tanks. Environmental Progress & Sustainable Energy 2011, 30 (1), 102-112.
Edwards et al., "Rheological effects of commercial waxes and polyphosphoric acid in bitumen 160/220—low temperature performance," Fuel, 2006, 85(7-8):989-997.
Edwards et al., "Rheological effects of waxes in bitumen," Energy & Fuels, 2003, 17(3):511-520.
Fini, E.; Hajikarimi, P.; Rahi, M.; Moghadas Nejad, F., Physiochemical, Rheological, and Oxidative Aging Characteristics of Asphalt Binder in the Presence of Mesoporous Silica Nanoparticles. Journal of Materials in Civil Engineering 2016, 28, 04015133, 9 pages.
First et al., "Discovery of novel zeolites for natural gas purification through combined material screening and process optimization," AIChE Journal, 2014, 60(5):1767-1785.
Fujiki, J.; Furuya, E., Density functional theory study of adsorption of benzothiophene and naphthalene on silica gel. Fuel 2016, 164, 180-185.
Ghanoon, S. A.; Tanzadeh, J., Laboratory evaluation of nano-silica modification on rutting resistance of asphalt Binder. Construction and Building Materials 2019, vol. 223, 1074-1082.
Hajikarimi, P.; Shariati, S.; Rahi, M.; Kazemi, R.; Nejad, F. M.; Fini, E. H., Enhancing the Economics and Environmental Sustainability of the Manufacturing Process for Air-Blown bitumen. Journal of Cleaner Production 2021, 323, 128978, 9 pages.
Hashimoto, "Zeolite photochemistry: impact of zeolites on photochemistry and feedback from photochemistry to zeolite science," Journal of Photochemistry and Photobiology C: Photochemistry Reviews, 2003, 4(1):19-49.
Hidalgo, K.; Sierra Garcia, I.; Dellagnezze, B.; Oliveira, V., Metagenomic Insights Into the Mechanisms for Biodegradation of Polycyclic Aromatic Hydrocarbons in the Oil Supply Chain. Frontiers in Microbiology 2020, 11, 561506, 20 pages.
Hosseinnezhad et al., "Multiscale Evaluation of Moisture Susceptibility of Biomodified Bitumen," ACS Applied Bio Materials, 2019, 2(12):5779-5789.
Hung, Albert M., et al. "Effects of water exposure on bitumen surface microstructure." Construction and Building Materials 135 (2017): 682-688.
Hung, Albert M., et al. "Intermolecular interactions of isolated bio-oil compounds and their effect on bitumen interfaces." ACS Sustainable Chemistry & Engineering 5.9 (2017): 7920-7931.
Hung, A. M., & Fini, E. H. (2019). Absorption spectroscopy to determine the extent and mechanisms of aging in bitumen and asphaltenes. Fuel, 242, 408-415.
International Agency for Research on Cancer (IARC), IARC Monographs on the Evaluation of Carcinogenic Risks to Humans: Overall evaluations of Carcinogenicity, An Updating of IARC Monographs vols. 1-42 (Lyon), 1987, 449 pages.
Kabir, S. F.; Mousavi, M.; M. Hung, A.; H. Fini, E., High-sulfur bitumen amplifies the effect of polyphosphoric acid. Fuel 2022, 314, 123128, 10 pages.
Kalló, "Applications of natural zeolites in water and wastewater treatment," Reviews in mineralogy and geochemistry, 2001, 45(1), 519-550.
Karnati, S. R., et al. Application of surface-modified silica nanoparticles with dual silane coupling agents in bitumen for performance enhancement. Construction and Building Materials 2020, 244, 118324, 9 pages.
Khalid et al., Removal of phenol from water by adsorption using zeolites. Industrial & Engineering Chemistry Research 2004, 43(17), 5275-5280.
Langmi et al., Hydrogen adsorption in zeolites A, X, Y and RHO. Journal of Alloys and Compounds 2003, 356, 710-715.
Leinonen et al., Purification of metal finishing waste waters with zeolites and activated carbons. Waste management & research 2001, 19(1), 45-57.
Lemarchand, Claire A., et al. "Cooee bitumen: Chemical aging." The Journal of chemical physics 139.12 (2013). 36 pages.

(56) References Cited

OTHER PUBLICATIONS

Li, D. D., & Greenfield, M. L. (2014). Chemical compositions of improved model asphalt systems for molecular simulations. Fuel, 115, 347-356.
Lu et al., (2007). "Effect of bitumen wax on asphalt mixture performance." Construction and building materials, 21(11), 1961-1970.
Maghsoodlou, M.; Mostafa, S.; Khorassani, H.; Heydari, R.; Hazeri, N.; Sajadikhah, S.; Rostamizadeh, M.; Keishams, L., Silica supported polyphosphoric acid (PPA-SiO2): An efficient and reusable heterogeneous catalyst for the one-pot synthesis of α-amino phosphonates. Turkish Journal of Chemistry 2010, 34, 565-570.
Mahmudov, K. T.; Guedes da Silva, M. F. C.; Zubkov, F. I.; Pombeiro, A. J. L., Noncovalent Interactions in Alkane Chemistry. In Alkane Functionalization, 2019; pp. 539-555.
Masson, J. F., Brief Review of the Chemistry of Polyphosphoric Acid (PPA) and Bitumen. Energy & Fuels 2008, 22 (4), 2637-2640.
Masson, J. F.; Gagné, M., Polyphosphoric Acid (PPA)-Modified Bitumen: Disruption of the Asphaltenes Network Based on the Reaction of Nonbasic Nitrogen with PPA. Energy & Fuels 2008, 22 (5), 3402-3406.
Menapace et al., (2018). "Effect of recycling agents in recycled asphalt binders observed with microstructural and rheological tests." Construction and Building Materials, 158, 61-74.
Mintova et al., (2015). "Nanosized microporous crystals: emerging applications." Chemical Society Reviews, 44(20), 7207-7233.
Moschopedis, S. E.; Speight, J. G., The effect of air blowing on the properties and constitution of a natural bitumen. Journal of Materials Science 1977, 12 (5), 990-998.
Moshoeshoe et al., A review of the chemistry, structure, properties and applications of zeolites. Am. J. Mater. Sci 2017, 7(5), 196-221.
Mousavi, M., Fini, E. H., & Hung, A. M. (2019). Underlying Molecular Interactions between Sodium Montmorillonite Clay and Acidic Bitumen. The Journal of Physical Chemistry C, 123(25), 15513-15522.
Musser et al., (1998). "Molecular characterization of wax isolated from a variety of crude oils." Energy & Fuels, 12(4), 715-725.
Naber et al., Industrial applications of zeolite catalysis. In Studies in surface science and catalysis, Elsevier: 1994; vol. 84, pp. 2197-2219.
National Asphalt Pavement Association (NAPA), Asphalt Pavement Industry Goals for Climate Stewardship: Toward Net Zero Carbon Emissions. https://www.asphaltpavement.org/climate/industry-goals. Jul. 10, 2022, 4 pages.
Oldham, Daniel J., et al. "Durability of bio-modified recycled asphalt shingles exposed to oxidation aging and extended sub-zero conditioning." Construction and building materials 208 (2019): 543-553.
Oldham, D., Qu, X., Wang, H., & Fini, E. H. (2020). Investigating change of polydispersity and rheology of crude oil and bitumen due to asphaltene oxidation. Energy & Fuels, 34(8), 10299-10305.
Pahlavan, Farideh, et al. "Investigating molecular interactions and surface morphology of wax-doped asphaltenes." Physical Chemistry Chemical Physics 18.13 (2016): 8840-8854.
Pavelić et al., Natural zeolite clinoptilolite: new adjuvant in anticancer therapy. Journal of molecular medicine 2001, 78 (12), 708-720.
Petersen, J. C.; Glaser, R., Asphalt Oxidation Mechanisms and the Role of Oxidation Products on Age Hardening Revisited. Road Materials and Pavement Design 2011, 12 (4), 795-819.
Petersen, J. C.; Harnsberger, P. M., Asphalt Aging: Dual Oxidation Mechanism and Its Interrelationships with Asphalt Composition and Oxidative Age Hardening. Transportation Research Record 1998, 1638 (1), 47-55.
Putranti et al., Adsorption of Free Fatty Acid (FFA) in Low-Grade Cooking Oil Used Activated Natural Zeolite as Adsorbent, IOP Conference Series: Materials Science and Engineering, IOP Publishing: 2018; 299:012085, 9 pages.
Rathod et al., (2014). "Experimental investigations on latent heat storage unit using paraffin wax as phase change material." Experimental Heat Transfer, 27(1), 40-55.
Roque-Malherbe, Complementary approach to the volume filling theory of adsorption in zeolites. Microporous and Mesoporous Materials 2000, 41(1-3), 227-240.
Rouquerol et al., Recommendations for the characterization of porous solids (Technical Report). Pure and Applied Chemistry 1994, 66(8), 1739-1758.
Rubio et al., Warm mix asphalt: an overview. Journal of Cleaner Production 2012, 24, 76-84.
Samieadel et al., (2017). "Multi-scale characterization of the effect of wax on intermolecular interactions in asphalt binder." Construction and Building Materials, 157, 1163-1172.
Samieadel et al., (2018). "Examining the Implications of Wax-Based Additives on the Sustainability of Construction Practices: Multiscale Characterization of Wax-Doped Aged Asphalt Binder." ACS Sustainable Chemistry & Engineering, 7(3), 2943-2954.
Samieadel, Alireza, et al. "Investigating molecular conformation and packing of oxidized asphaltene molecules in presence of paraffin wax." Fuel 220 (2018): 503-512.
Samieadel, A.; Fini, E. H., Interplay between wax and polyphosphoric acid and its effect on bitumen thermomechanical properties. Construction and Building Materials 2020, 243, 118194, 14 pages.
Sarkhel, S.; Rich, A.; Egli, M., Water-Nucleobase "Stacking": H-πand Lone Pair-π Interactions in the Atomic Resolution Crystal Structure of an RNA Pseudoknot. Journal of the American Chemical Society 2003, 125 (30), 8998-8999.
Savage et al., Nanomaterials and water purification: opportunities and challenges. Journal of Nanoparticle Research 2005, 7(4-5), 331-342.
Shariati, Saba, et al. "Interaction mechanisms of polyphosphoric acid and nano clay in bituminous composites." Journal of Colloid and Interface Science 588 (2021): 446-455.
Slough et al., "High precision heat capacity measurements of metals by modulated DSC." In Proc NATAS Annu Conf Therm Anal Appl, 2006, 34:160, 6 pages.
Soenen et al., (2014). "Laboratory investigation of bitumen based on round robin DSC and AFM tests." Materials and Structures, 47(7), 1205-1220.
Soenen, H.; Heyrman, S.; Lu, X.; Redelius, P.; Edwards, J. C. In the Interaction of Polyphosphoric Acid with Bituminous Binders, 8th RILEM International Symposium on Testing and Characterization of Sustainable and Innovative Bituminous Materials, Dordrecht, 2016; Canestrari, F.; Partl, M. N., Eds. Springer Netherlands: Dordrecht, 2016; pp. 103-114.
Sun et al., (1994). "An ab initio CFF93 all-atom force field for polycarbonates." Journal of the American Chemical Society, 116(7), 2978-2987.
Swartz, C. D.; King, L. C.; Nesnow, S.; Umbach, D. M.; Kumar, S.; DeMarini, D. M., Mutagenicity, stable DNA adducts, and abasic sites induced in *Salmonella* by phenanthro[3,4-b]- and phenanthro[4,3-b]thiophenes, sulfur analogs of benzo[c]phenanthrene. Mutation Research/Fundamental and Molecular Mechanisms of Mutagenesis 2009, 661 (1), 47-56.
Tutu et al., Warm-mix asphalt and pavement sustainability: A review. Open Journal of Civil Engineering 2016, 6(02), 84-93.
Vanderbilt, Soft self-consistent pseudopotentials in a generalized eigenvalue formalism. Physical Review B 1990, 41 (11), 7892-7895.
Vassiliev, N.; Davison, R.; Williamson, S.; Glover, C., Air Blowing of Supercritical Asphalt Fractions. Industrial & Engineering Chemistry Research—Ind Eng Chem Res 2001, 40, 1773-1780.
Vekariya, R. H.; Prajapati, N. P.; Patel, H. D., Silica-supported polyphosphoric acid (PPA-SiO2): An efficient and reusable heterogeneous catalyst for ecofriendly organic synthesis. Synthetic Communications 2016, 46 (3), 197-219.
Williams et al., (1955). "The temperature dependence of relaxation mechanisms in amorphous polymers and other glass-forming liquids." Journal of the American Chemical society, 77(14), 3701-3707.

(56) References Cited

OTHER PUBLICATIONS

Xu et al., (2019). "Evaluation and optimization of VPSA processes with nanostructured zeolite NaX for post-combustion CO2 capture." Chemical Engineering Journal, 371:693-705.
Yilmaz et al., Catalytic applications of zeolites in chemical industry. Topics in Catalysis 2009, 52(6-7), 888-895.
Ates, Ayten, et al. "Abatement of nitrous oxide over natural and iron modified natural zeolites." Applied Catalysis A: General 407.1-2 (2011): 67-75.
Chen, Shaojiang, et al. "Exploratory synthesis of low-silica nanozeolites through geopolymer chemistry." Crystal Growth & Design 19.2 (2019): 1167-1171.

* cited by examiner $E_{ads}$= -32.0 kcal/mol $E_{ads}$= -54.6 kcal/mol $E_{ads}$= -42.0 kcal/mol $\Delta E$= -62.64

BITUMEN COMPOSITES WITH IMPREGNATED ZEOLITES

CROSS-REFERENCE TO RELATED APPLICATION

This application claims the benefit of U.S. Patent Application No. 63/371,603 filed on Aug. 16, 2022, which is incorporated by reference herein in its entirety.

STATEMENT OF GOVERNMENT SUPPORT

This invention was made with government support under 1928795 awarded by the National Science Foundation. The government has certain rights in the invention.

TECHNICAL FIELD

This invention generally relates to bitumen composites with amine-impregnated zeolites for use as antistripping agents in asphalt.

BACKGROUND

Antistripping agents are among the chemical additives used in warm-mix asphalt (WMA) to improve the durability of the asphalt by reducing its susceptibility to moisture. Moisture disrupts the adhesion between the binder (bitumen) and aggregates (e.g., sand, crushed stone, gravel, rock dust), reducing the useful lifetime of the asphalt.

SUMMARY

This disclosure describes an amine-impregnated zeolite that functions as a solid amine-based antistripping agent to enhance the durability of bitumen composites, including asphalt. Antistripping agents are combined with bitumen to reduce the susceptibility of asphalt to moisture, which disrupts the adhesion between the bitumen and aggregates. Amine-based liquid antistripping agents can lose their efficacy over time (e.g., when exposed to high temperatures). For amine-impregnated zeolite solid antistripping agents, the amine molecules loaded into the zeolite's pores can be gradually released into the matrix of bitumen and act as antistripping agents over a longer length of time, leading to increased durability of the asphalt. A solid antistripping agent using zeolite as a carrier can be made using liquid antistripping agents.

In a first general aspect, a bitumen composite includes an amine-impregnated zeolite and bitumen. The amine-impregnated zeolite includes a zeolite impregnated with an amine.

Implementations of the first general aspect may include one or more of the following features.

In some implementations, the bitumen composite includes about 0.1 wt % to about 5 wt % of the amine. A weight ratio of the amine to the zeolite is up to about 1 (e.g., about 0.6 to 1). The bitumen composite typically includes up to 5 wt % of the zeolite. One example of a suitable amine is ethylenediamine. The zeolite can be a natural or synthetic zeolite. In some cases, the zeolite is a Faujasite-type zeolite.

In implementations, the bitumen composite further includes an aggregate. The aggregate can include one or more of sand, crushed stone, gravel, and rock dust.

In a second general aspect, forming a bitumen composite includes combining bitumen and an amine-impregnated zeolite to yield a mixture, and heating the mixture to yield the bitumen composite. The amine-impregnated zeolite includes a zeolite impregnated with an amine.

Implementations of the second general aspect may include one or more of the following features.

Some implementations include heating the mixture to a temperature of about 100° C. to about 200° C. Heating the mixture can include heating the mixture for about 1 minute to about 100 minutes.

In some implementations, the bitumen composite includes about 0.1 wt % to about 5 wt % of the amine. A weight ratio of the amine to the zeolite is up to about 1 (e.g., about 0.6 to 1). The bitumen composite typically includes up to 5 wt % of the zeolite. One example of a suitable amine is ethylenediamine. The zeolite can be a natural or synthetic zeolite. In some cases, the zeolite is a Faujasite-type zeolite.

Some implementations include combining the bitumen composite with an aggregate. The aggregate can include one or more of sand, crushed stone, gravel, and rock dust.

In a third general aspect, a composition includes the bitumen composite of the first general aspect.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1B:
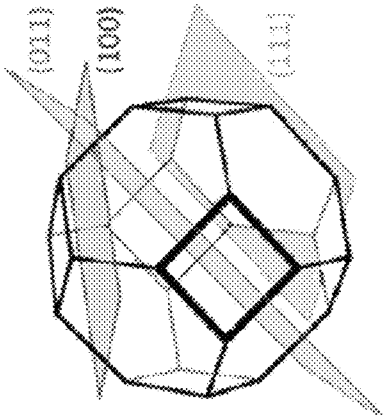
FIG. 1B is a schematic representation of a sodalite cage cut out with three Miller index surfaces, {111}, {100}, and {011}.

This disclosure describes an amine-impregnated zeolite that functions as a solid amine-based antistripping agent to enhance the durability of bitumen composites, including asphalt. Antistripping agents are combined with bitumen to reduce the susceptibility of asphalt to moisture, which disrupts the adhesion between the bitumen and aggregates. Amine-based liquid antistripping agents lose their efficacy over time, particularly when exposed to high temperatures. For amine-impregnated zeolite solid antistripping agents, the amine molecules loaded into the zeolite's pores can be gradually released into the matrix of bitumen and act as antistripping agents over a longer length of time, leading to increased durability for the asphalt. A solid antistripping agent using zeolite as a carrier can be made using liquid antistripping agents.

A bitumen composite with an amine-impregnated zeolite includes about 0.1 wt % to about 5 wt % of the amine. One example of a suitable amine is ethylenediamine. The weight ratio of the amine to the zeolite is typically up to about 1. The weight ratio of the amine to the zeolite is typically in a range of about 0.6 to 1. The bitumen composite typically includes up to 5 wt % of the zeolite. Suitable zeolites include natural and synthetic zeolites. Examples of suitable zeolites include Faujasite-type zeolites. The bitumen composite with the amine impregnated zeolite can further include one or more aggregates (e.g., sand, crushed stone, gravel, and rock dust).

A method of forming the bitumen composite with an amine-impregnated zeolite includes combining bitumen with an amine-impregnated zeolite and heating the mixture to a temperature of about 100° C. to about 200° C. for about 1 minute to about 100 minutes.

Zeolite cavities can protect amine-based antistripping additives that would otherwise be susceptible to aging. In addition to abundant naturally occurring zeolite, synthetic zeolites can be a low-cost alternative made from sewage sludge ash, turning waste into a value-added product while removing toxic contaminants found in sewage.

Moisture-induced shear-thinning index (MISTI) tests can be performed to evaluate the moisture resistance of bitumen samples including anti-stripping additives of pure ethylenediamine, pure zeolite, amine-zeolite (non-treated), and amine-impregnated zeolite. A rolling thin-film oven (RTFO) and a pressure aging vessel (PAV) can be used to simulate the short-term aging and long-term field oxidative aging of bitumen samples, respectively. To gain molecular-level insight into the adsorption behaviors of amine-impregnated zeolite and the replacement of amine molecules with some small molecules of bitumen, a series of quantum-based calculations can be performed using a dispersion-corrected density functional theory (DFT-D) approach.

EXAMPLES

Sample Preparation

A bitumen known to be susceptible to moisture was selected. Modification of bitumen was carried out by addition of modifiers into the bitumen; mixing was performed at a temperature of 150° C. for 10 min. To prepare a bitumen composite including an amine-impregnated zeolite, the amine was added to zeolite at a ratio of (0.62:1) and mixed well, so that all amine was absorbed by the zeolite powder. The amount of powder added to the bitumen was calculated to ensure that 1 wt % amine (based on the weight of the bitumen) was introduced into the bitumen. For example, to prepare 20 g of bitumen composite, 0.20 g of amine (1 wt % amine) was added to 0.32 g zeolite (0.62:1 amine to zeolite); this amine-impregnated zeolite was added to the bitumen. For bitumen with non-treated zeolite, the same amount of zeolite used in preparing the bitumen with amine-impregnated zeolite was incorporated into bitumen as non-treated powder. This amount of zeolite corresponds to 1.6 wt % (based on the weight of the bitumen). For bitumen with amine and zeolite, the same amounts of zeolite and amine used in preparing the bitumen with amine-impregnated zeolite were added separately into bitumen. In this case, the amine was free and not absorbed by the zeolite powder. Therefore, three types of bitumen containing zeolite were prepared and tested.

Moisture-Induced Shear-Thinning Index

The moisture-induced shear-thinning index (MISTI) was developed to quantify the susceptibility of a bitumen-aggregate interface to moisture damage. To determine the MISTI, a shear-rate ramp test was performed on a mixture of stones and bitumen, using a dynamic shear rheometer (Anton Paar MCR 302 DSR) with an 8-mm spindle. A mixture containing a 2:1 ratio of bitumen and glass beads was placed in silicon molds to form 8-mm disk-shaped specimens. Each specimen was then demolded and placed in a parallel-plate test setup of the DSR to be tested. A ramping shear rate (0.1 to 100 l/s) was applied on the specimen, and the viscosity value was measured at each shear rate. The testing temperature was adjusted so that the initial viscosity was close to 1000 Pa·s. A plot of viscosity versus shear rate was then used for analysis. Three types of bitumens were tested: bitumen with non-treated zeolite, bitumen with amine-impregnated zeolite, and bitumen with amine and zeolite. For each bitumen, two samples were tested while remaining unconditioned, and the other two samples were conditioned in distilled water at 60° C. for 24 hours before testing. After that, the MISTI value was determined for each bitumen using Eq. 1, based on the shear-thinning slopes before and after water conditioning. The change in shear-thinning slope after water conditioning is related to the effect of water at the interface between bitumen and glass beads. A MISTI value closer to 1 indicates better resistance to moisture damage.

$$MISTI = \frac{\text{Average shear-thinning slope of unconditioned samples}}{\text{Average shear-thinning slope of water-conditioned samples}} \quad (1)$$

The moisture-induced shear-thinning index is a test that specifically characterizes the susceptibility of a bitumen-stone interface to moisture damage. MISTI is based on the science of surface energy, adsorption, and desorption dynamics at the interface. Since the role of an amine-based antistripping agent is to modify the interface between bitumen and stone aggregates, the MISTI test is best suited to evaluate any changes at the interface.

Laboratory Aging

The aging test used a rolling thin-film oven (RTFO) for short-term aging and a pressure aging vessel (PAV) for long-term aging of two mixtures separately: the mixture containing amine-impregnated zeolite bitumen and glass beads; and the mixture containing amine and zeolite bitumen and glass beads. Short-term aging was performed by applying a temperature of 163° C. and an airflow rate of 4

L/minute for 85 min, following the standard AASHTO T240. Then, long-term aging was conducted by applying an air pressure of 2.10 MPa and a temperature of 105° C. on bitumens aged from the RTFO, following the standard AASHTO PP1. The durations of aging in the PAV were set to be 20 h, 40 h, or 60 h, referred to as 1PAV, 2PAV, and 3PAV, respectively.

Computational Details

Zeolites are porous materials with a 3-D network of $(SiO_4)^{4+}$ and $(AlO_4)^{5+}$ tetrahedron units linked to one another to form open cavities in the form of cages and channels. A zeolite structure is usually described by the type of zeolite's framework in terms of the size of the pore openings and the dimensionality of the channel system. Pore openings (entrance windows) are characterized by the size of the ring defining the pore: an 8-member ring is considered as a small pore opening, a 10-member ring a medium one, and a 12-member ring a large one, with free diameters of approximately 4.1, 5.5, and 7.4 Å, respectively. With pore openings of 7.4 Å, the Faujasite-type zeolites are among the largest-pore zeolites currently used in industry. In Faujasite-type zeolites, 12-member-oxygen rings of pore openings, with a free diameter of 7.4 Å, lead to access the small cages, named sodalite cages (β-cages, with 6.3 Å diameter), and large cages (supercages, with about 12 Å diameter). In a complete (intact) structure, sodalites are not accessible, even for small molecules, due to their narrow 6-member ring openings of about 2.5 Å, implying that these materials are not used in their full capacity.

Natural zeolites have limited applications in industry due to their crystal structure and small pores; however, more than 200 types of zeolites with different crystal structures have been obtained synthetically. The particles of synthetic zeolites can be formed into a desired shape that has many advantages in scale-up. Depending on the Si/Al ratio, synthetic Faujasite zeolites are commonly categorized into zeolite X (with a ratio of Si/Al=1-1.5) and zeolite Y (with a ratio of Si/Al=1.5-2). X zeolites (with a higher Al content) are unstable in water and acids at elevated temperatures; Y zeolites (with a higher Si content) provide higher thermal stability for the zeolite.

The synthetic zeolite used in this test, synthesized through a "geopolymer gel" route, is a sodium aluminosilicate product containing Faujasite, Linda type A, and Sodalite frameworks for the precursor mixture compositions of Si/Al=2 and Na/Al=3. The pure phase of Faujasite is obtained only in ratios of Si/Al=3 and Na/Al=4, which implies a narrow phase region for the structure. However, considering the large size of the pore openings in Faujasite nanozeolites and their high capacity as a carrier, a Faujasite-type zeolite was modeled for the DFT calculations.

The initial geometry of the Faujasite-Na unit cell used in this test was derived from the structural and crystal-chemical features reported in AMCSD (American Mineralogist Crystal Structure Database) with the database code 0006772 information. This unit cell with the chemical formula of $Na_{256}Al_{96}Si_{96}O_{384}$ has cell length parameters a=b=c=25.10 Å and cell angles α=β=γ=90°. The ratio of Na:Al:Si=2.7:1:1 in this low-silica dehydrated zeolite was changed to Na:Al:Si=2.5:1:2 to simulate the chemical composition of its synthetic analogue. The newly formed cell has fewer Na cations, resulting from the decrease in Al content, leading to a reduced polarity in the supercage network compared to the zeolite with high Al content. The primitive unit cell of Faujasite-Na with the chemical formula of $Na_{40}Al_{16}Si_{32}O_{96}$ is shown in FIG. 1A. From the primitive unit cell, a periodic slab was created by the {111} surface model of Faujasite, with 20 Å vacuum, and fully optimized to be used in the next step: making cluster models.

The CASTEP module implemented in the Accelrys Materials Studios program package was used to create the periodic slab and to perform the DFT plane-wave pseudopotential calculations to optimize the target slab. The PBE (Perdew-Burke-Ernzerhof) exchange-correlation functional of generalized gradient approximation (GGA), and Grimme's dispersion correction were used to generate a general functional termed PBE-D. The overall quality of "Medium", with kinetic-energy cut-off of 330 eV and k-point (1×1×1), was set for numerical calculations. Under ultrasoft pseudopotential, full atomic position optimization was performed. At this level of calculation, the convergence criteria for energy, maximum force, stress, and displacement would be $2.0\times10^{-5}$ eV/atom, $5\times10^{-2}$ eV/Å, $1\times10^{-1}$ GPa, and $2\times10^{-3}$ Å, respectively.

Cluster Approach

In the cluster approach, molecular clusters are decoupled from the surrounding lattice in a periodic structure to study the interactions between target organic molecules and specific parts of the zeolite. Here, the molecular clusters were isolated from the corresponding fully optimized slab made in the periodic boundary condition (PBC) approach discussed earlier. Two clusters were decoupled from the PBC slab: 1—an entrance window (pore opening) of a supercage characterized by a 12-member-oxygen ring; and 2—a sodalite cage with its surrounding lattice containing three hexagonal prisms. Both clusters accommodate a number of monovalent extra-framework cations of Na whose positions in the model zeolite are determined using energy minimization, as implemented in DMol3 code. The terminal atoms of the 12-member ring were capped with H for O atoms and with OH for Al atoms and Si atoms. In the sodalite case, all the broken bonds in layers far from the interactions were saturated with H atoms. A supercage window and a small cage (sodalite) of the Faujasite-type zeolite, viewed along the {111} surface, are shown in FIG. 1A.

To preserve the bulk-like rigidity below the surfaces and at positions far from the interactions, some layers were kept fixed during the optimization of adsorption complexes; in the figures pertaining to the clusters and their interactions, variable atom positions are shown in "ball and stick", and fixed atoms are shown in "line". If this rigidity is lost due to truncation, the system behaves like a molecule with a certain degree of artificial flexibility, leading to an overestimation of the binding energy.

Optimization of the clusters and their corresponding interactions with organic compounds was performed through the non-periodic DMol3 module implemented in the Accelrys Materials Studio program package. As for the PBC approach described, PBE was used as the exchange-correlation functional, and Grimme's dispersion correction was added to the calculations to include the long-range dispersion correction. A double numeric basis set, DND, was used for all-electron optimization. At this level of calculation, the tolerances for energy, maximum force, and displacement convergence were $2.0\times10^{-5}$ Hartree, $4.0\times10^{-3}$ Hartree/Å, and $5.0\times10^{-3}$ Å, respectively.

Adsorption energy ($E_{ads}$), the energy for the interaction between the zeolite clusters and organic molecules, was calculated using Eq. 2, where $E_{complex}$ is the energy of the optimized adsorption complex, and $E_{Organic\ Compound}$ and $E_{Cluster}$ are the calculated energies for the isolated components (organic compound and zeolite cluster) when they are in their lowest energy states.

$$E_{ads}=E_{complex}-(E_{Organic\ compound}+E_{Cluster}) \qquad (2)$$

Zeolite Surfaces

A zeolite's external surfaces influence the zeolite's reactivity, growth mechanism, and properties. Based on the findings of the molecular dynamics simulation, the surface structure of zeolites impact the adsorption and transport of $CO_2$ and the binary mixture of $CO_2/N_2$ in Faujasite zeolites, and in the adsorption of $CH_4$ gas molecules in Linde type A and AFI zeolites. Many surface configurations are possible to cut out from zeolites, however, Miller index surfaces are known as the most significant surfaces of a crystal with the highest stability. In this test, the minimized structure of a sodalite cage was cut along the Miller indices to obtain the surfaces with general orientations {100}, {011}, and {111}. A further consideration for cleaving a crystal is the formation of dangling bonds such as three-coordinate Si or one-coordinate O at the truncated surface. In many cases, created surfaces are hydroxylated to saturate the broken bonds of Al or Si. In this test, dangling bonds were terminated to H atoms to provide a neutral surface model while avoiding exaggerating the number of hydroxyl groups accessible to interact with approaching guest molecules and consequently overestimating the adsorption energy values.

Figure 1A:
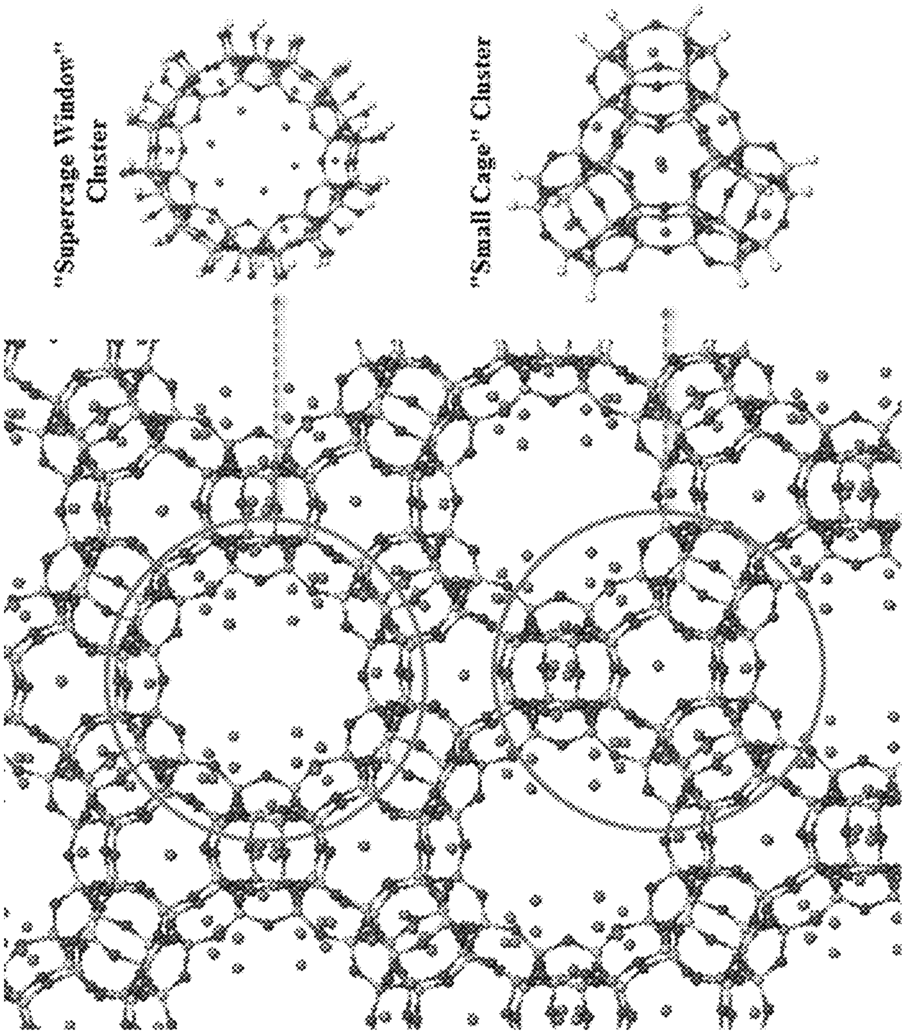
FIG. 1A depicts two cluster models isolated from the {111} Faujasite surface: a supercage-window cluster and a small cage (sodalite).

FIG. 1B depicts how the sodalite cage is broken by the surface cuts {100}, {011}, and {111}. The {111} surface is identified as the most stable face and therefore is predicted to be the dominant surface in crystal morphology. The {111} surface cuts through the hexagonal prisms (double 6-rings) between the sodalite cages; that is why the sodalite cage is not broken by this cut, and inside the cage is not accessible to guest molecules. Although the sodalite cage will be intact in the {111} cut, interaction of guest molecules with an exterior wall of the sodalite cage cannot be overlooked.

In contrast to the {111} cut, the {011} and {100} surfaces cut through the sodalite cage, leaving the inside of the cage accessible to guest molecules. Referring to FIG. 1B, in {100} termination, the {100} plane is oriented parallel to one single 4-ring face, leaving the cage open to the entry of guest molecules; the cleaved bonds of the uppermost part of the cage turn the broken edges into strong adsorption sites. Compared to the {100} plane, the {011} plane cuts more spaces of the cage; the {011} plane passes through the middle of the 6-ring window and cuts the sodalite cage in half. The {011} surface leaves more active sites for interaction with guest molecules and acts as a strong adsorption site.

The interactions of ethylenediamine and seven polar molecules of bitumen with a sodalite cage were tested for two cases: cut out with the {111} surface, where the cage is intact and the interactions are limited to the exterior wall of sodalite; and cut out with the {100} surface, where the cage is broken and the active sites of the broken edge and interior space of sodalite are accessible.

Potential Candidates for Substitution of Ethylenediamine in Zeolite Pores

To test the capability of zeolite as the adsorbate for some bitumen compounds, the adsorption behavior of ethylenediamine in zeolite pores was compared to that of seven small polar compounds of bitumen that are assumed to be potential candidates to substitute for ethylenediamine after its gradual discharge into the medium. These small polar compounds may also function as the external stimulus to facilitate detachment of amine molecules and their release into the bitumen matrix.

The seven small molecules selected here (quinoline, pyridine, benzofuran, benzoic acid, hexanal, 3-pentylthiophene, and hexanethiol (Table 1)) contain polar groups of N, O, and S that intensify their interactions with electrostatic fields inside the zeolite pores. Depending on the source of crude oil and the manufacturing processes, the chemical composition of bitumen varies. A general estimation of bitumen's elemental analysis is that most bitumens contain 79%-88% by weight of carbon, 7%-13% H, 8% S, 2%-8% O, 3% N, and trace amounts of metals such as iron, nickel, and vanadium. Many compounds of bitumen are polar compounds carrying S-, N-, and O-containing functional groups such as thiol, amine, amide, phenol, carboxyl, and alcohol. In the list of polar compounds selected for interaction with zeolite, some polar compounds such as benzoic acid, benzofuran, hexanethiol, and hexanal are volatile or semi-volatile compounds of bitumen that can be emitted from the bituminous composites, negatively impacting both air quality and the durability of composites. For many years, asphalt pavement and asphalt binder (bitumen) have been known as sources of hazardous emissions during hot applications. However, asphalt emissions are not limited to high temperatures during the production of asphalt mixtures or paving operations; there are continuous emissions at ambient temperatures, and the emissions significantly worsen when surfaces are exposed to solar radiation or high temperatures.

TABLE 1

| Ethylenediamine and potential polar compound candidates of bitumen for substitution of the ethylenediamine molecules or accommodating the locations vacated by ethylenediamine molecules in zeolite pores. |
|---|
| 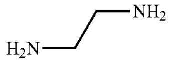 |
| Ethylenediamine |
| 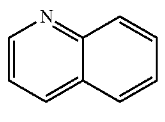 |
| Quinoline |
| 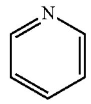 |
| Pyridine |
| 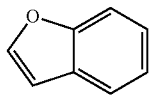 |
| Benzofuran |
| 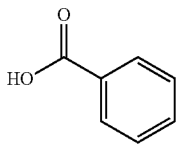 |
| Benzoic acid |

TABLE 1-continued

| Ethylenediamine and potential polar compound candidates of bitumen for substitution of the ethylenediamine molecules or accommodating the locations vacated by ethylene-diamine molecules in zeolite pores. |
|---|
| 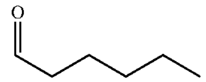 Hexanal |
| 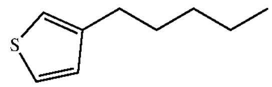 3-Pentylthiophene |
| 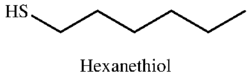 Hexanethiol |

Figure 2A:
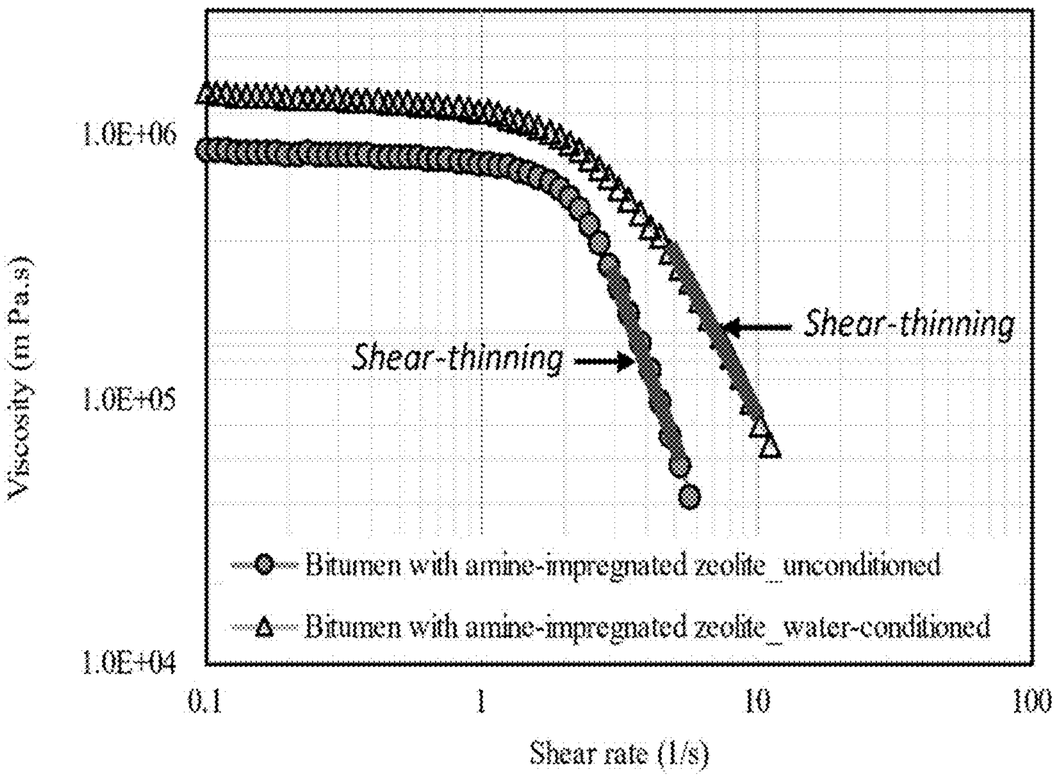
FIGS. 2A and 2B are plots of viscosity versus shear rate and slope of shear thinning (Power-Law Slope), respectively, for bitumen with amine-impregnated zeolite, before and after water conditioning.
Figure 2B:
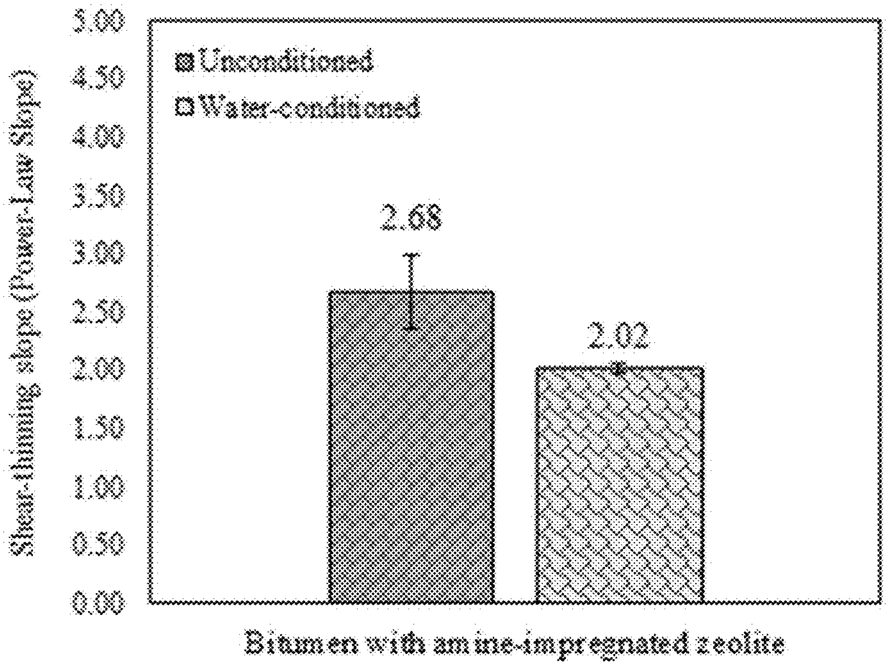
Figure 3:
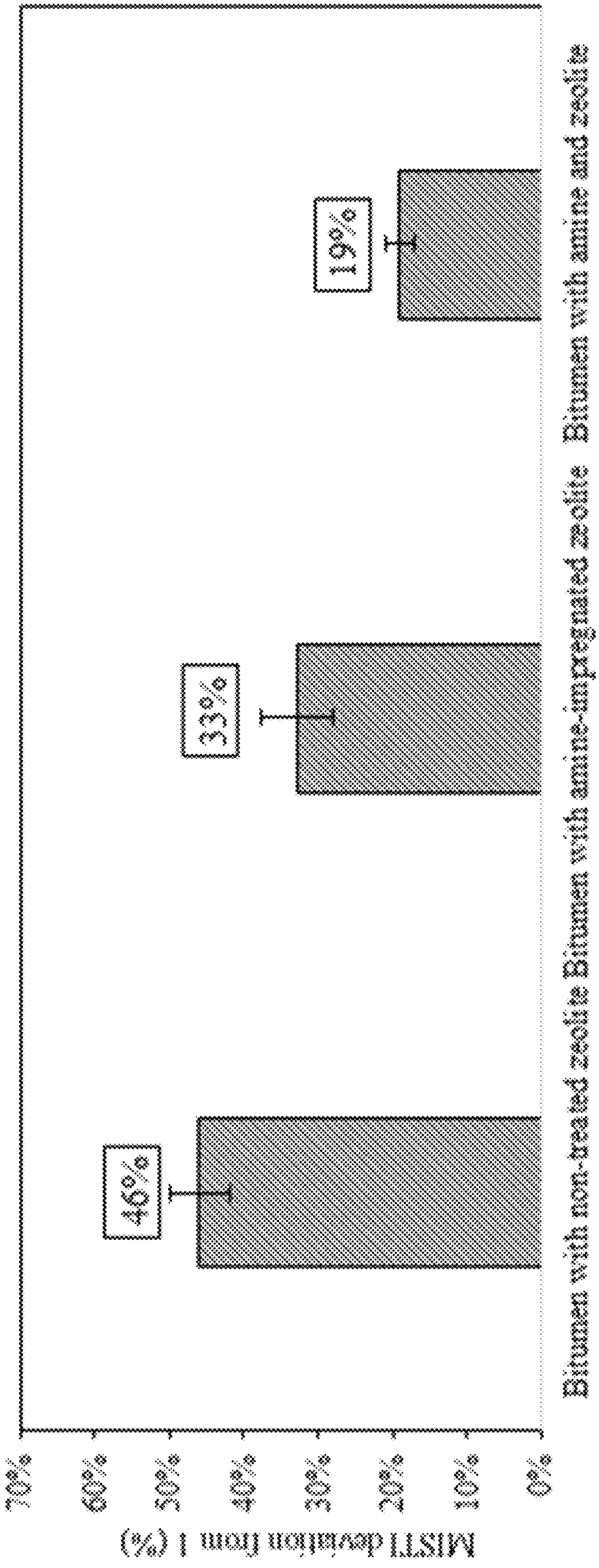
FIG. 3 is a plot showing the moisture-induced shear-thinning index (MISTI) deviation from 1 for bitumen with non-treated zeolite, bitumen with amine-impregnated zeolite, and bitumen with amine and zeolite.

FIGS. 2A and 2B show the viscosity measured at different shear rates and the power-law slope of shear thinning, respectively, for bitumen with amine-impregnated zeolite, before and after water conditioning. After water conditioning, the viscosity increased, and the shear-thinning slope was reduced. The interaction between bitumen and glass beads is closely related to shear-thinning slope; a steeper shear-thinning slope indicates greater interaction between bitumen and glass beads. Better resistance to moisture damage is associated with a MISTI value closer to 1. A MISTI value of 1 implies no changes at the interface due to water. Improvements in moisture resistance were observed for bitumen containing amines; bitumen containing amines had MISTI deviations values lower than MISTI deviation value of bitumen containing non-treated zeolite. The presence of acidic compounds at the bitumen-silica interface leads to increased susceptibility to moisture damage. Amines can neutralize silica's active sites, preventing the accumulation of these acidic compounds at the bitumen-stone interface. FIG. 3 shows the deviation of MISTI from the value of 1 for bitumens containing zeolite. Bitumen with non-treated zeolite exhibited the worst resistance to moisture damage, with 46% deviation. Bitumen with amine-impregnated zeolite (33% deviation) showed better resistance to moisture damage than bitumen with non-treated zeolite. Bitumen with amine and zeolite (19% deviation) showed better resistance than bitumen with amine-impregnated zeolite. Hence, the MISTI deviation value for bitumen with amine-impregnated zeolite (33%) shows that only a portion of the amine molecules are released into the bitumen matrix. This is supported by the MISTI deviation value for bitumen with amine and zeolite (19%) in which all the amine molecules are available in the matrix of bitumen at the mixing time.

Figure 4:
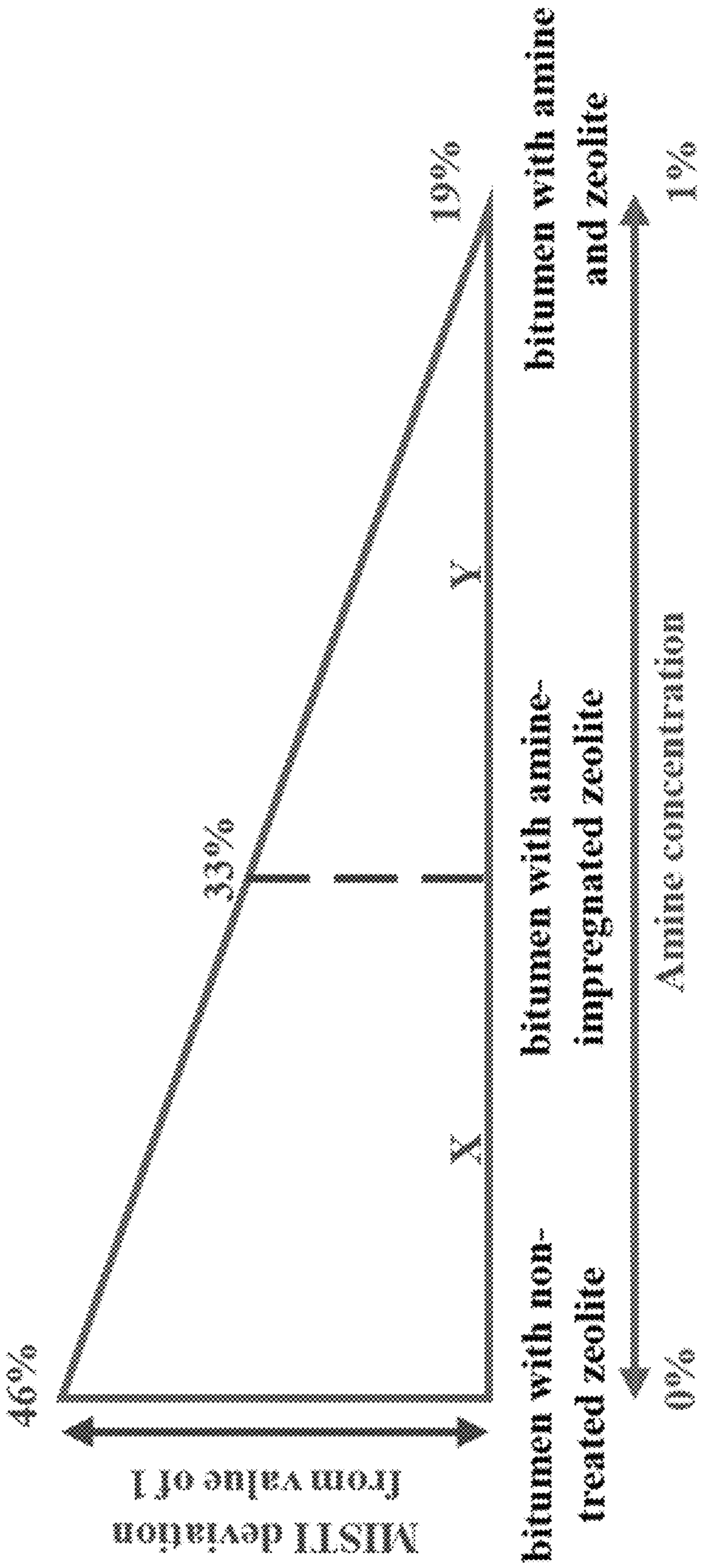
FIG. 4 is a plot showing the linear interpolation used to estimate the amine released into bitumen from amine-impregnated zeolite, based on bitumens containing zeolite.

FIG. 4 refers to amine concentrations (by weight) and MISTI deviations for bitumens containing zeolite, in order to estimate the amine released from amine-impregnated zeolite into the matrix of bitumen. Considering the amine concentration in each bitumen, 0% amine corresponds to bitumen with non-treated zeolite, and 1% amine corresponds to bitumen with amine and zeolite. Hence, the amine released from amine-impregnated zeolite into bitumen can be estimated using linear interpolation (as shown in FIG. 4). It was found that 48% of absorbed amine has been released into bitumen, and 52% of the amine has not yet been released from the amine-impregnated zeolite.

Referring to FIG. 4, the amine released from amine-impregnated zeolite, by bitumen's weight, is given by 1%–Y. Linear interpolation using $$\frac{33\% - 19\%}{Y} = \frac{46\% - 19\%}{1\%}$$

gives Y=0.52%. The amine released from amine-impregnated zeolite, by bitumen's weight, is thus given by 1%-0.52%=0.48%, and the percentage of amine released from amine-impregnated zeolite is given by $$\frac{048\%}{1\%} \times 100 = 48\%.$$

Figure 5:
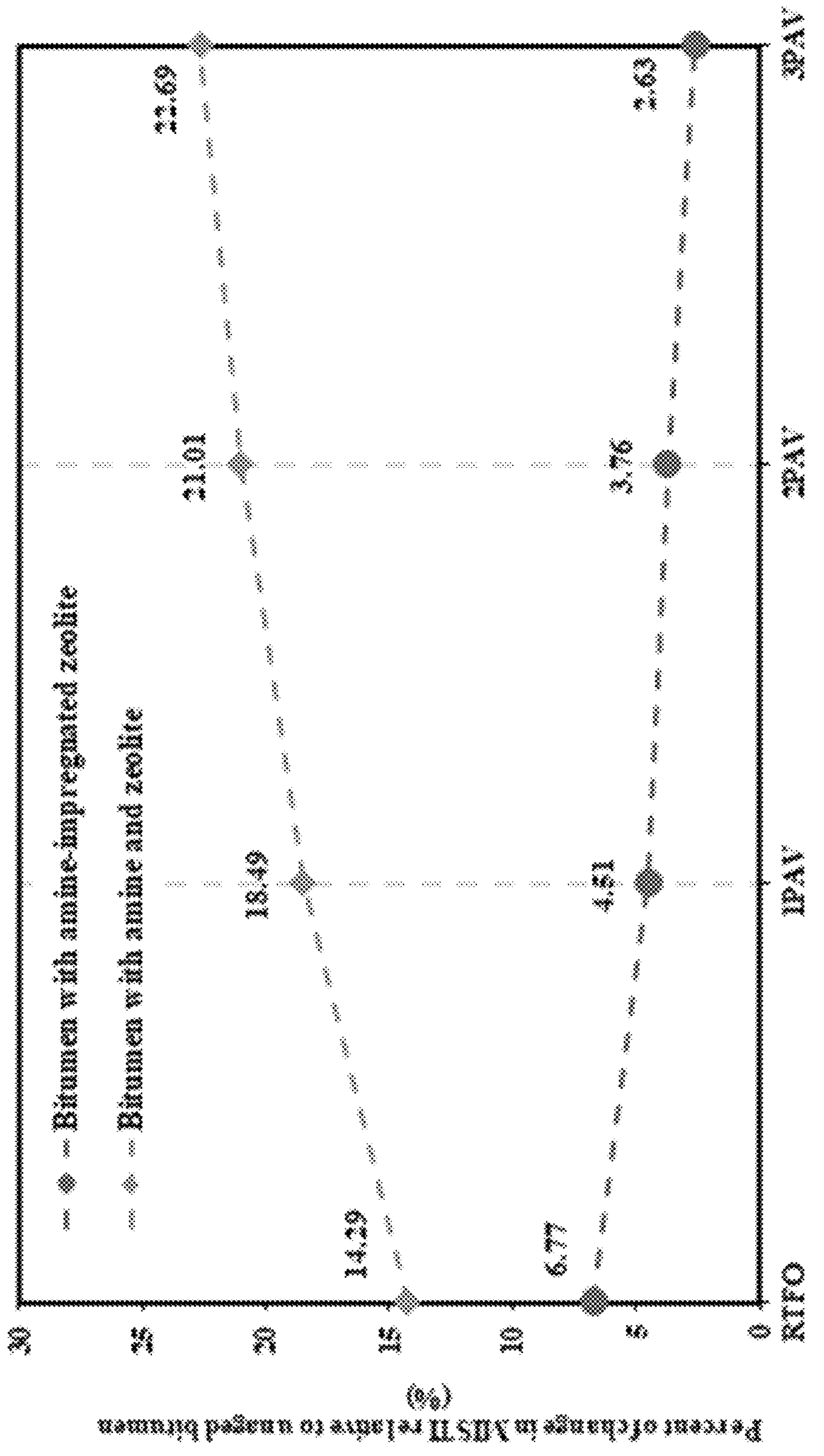
FIG. 5 is a plot showing the percent change in resistance to moisture damage in bitumen with amine-impregnated zeolite, and bitumen containing amine and zeolite added separately.

FIG. 5 shows the performance of bitumen containing amine-impregnated zeolite compared to the bitumen where amine and zeolite are added separately. Each PAV treatment consists of 20 hours of aging in a heated vessel pressurized to 2.10 MPa. As the accelerated aging progresses up to 60 hours in the 3PAV case, the difference in moisture resistance between the two bitumens increases. This increase in difference is attributed to the gradual release of amines that are retained in zeolite pores. Amine molecules added directly to bitumen age rapidly and lose their effectiveness as an anti-moisture additive; therefore, they are no longer available to protect against moisture. This, in turn, causes the MISTI (an indicator of moisture damage) to rapidly increase (14%-22%) relative to the unaged status as aging progresses. In contrast, in the case of bitumen with amine-impregnated zeolite, amines maintain their effectiveness for a long period; the MISTI remains low (2%-6%) up to 3PAV.

DFT-Based Molecular Modeling

Figure 6A:
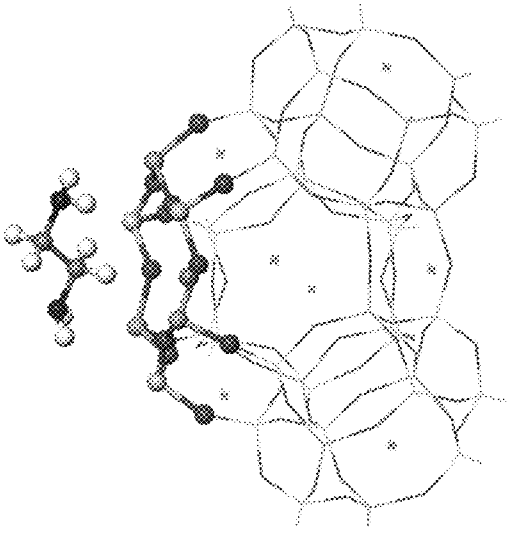
FIGS. 6A and 6B depict the adsorption of ethylenediamine onto the {111} sodalite cage and {100} sodalite cage, respectively.
Figure 6B:
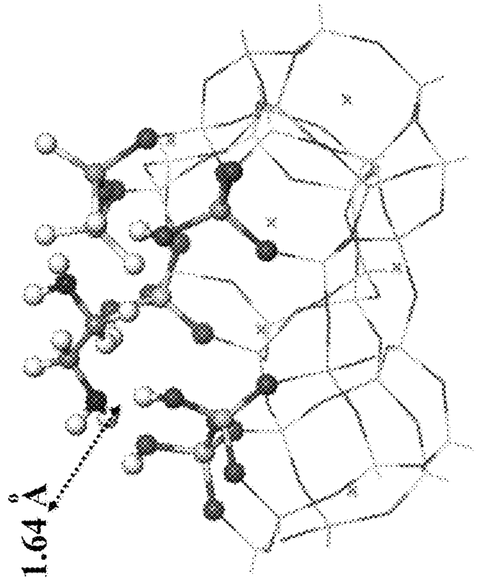

FIGS. 6A and 6B show the adsorption of ethylenediamine onto the two sodalite cages exposed to the Miller index surfaces {111} and {100}, respectively; here, these surfaces are named the {111} sodalite cage and the {100} sodalite cage. The most stable {111} sodalite cage is not broken by the Miller index surface, and the inside of the cage is not accessible to guest molecules. However, the DFT-based results show that the exterior walls of the sodalite cage, including the 6-ring sides, provide an appropriate electrostatic field for adsorption of ethylenediamine molecules. As depicted in FIG. 6A, the interaction of an ethylenediamine molecule with the 6-ring side of the {111} sodalite cage is associated with −32.0 kcal/mol adsorption energy, which can provide stability for the compound. This stabilization energy can be attributed to the electrostatic field of the sodalite framework, containing Al, Si, and O atoms of the hexagonal face, and an extra-framework Na cation that is accommodated on top of the hexagonal face of the sodalite cage.

The {100} sodalite cage is cut parallel to and just below the 4-rings face. Regardless of the probable transport of ethylenediamine into the broken cage, there are strong interactions between the active sites of the broken edge (containing OH groups) and the $NH_2$ groups of ethylenediamine. As shown in FIG. 6B, this adsorption is associated with H-bonding interaction between the N of amine and the OHs of the broken edge (binding distance=1.64 Å), leading to −54.6 kcal/mol stabilizing energy. The broken cage has a considerable potential to adsorb ethylenediamine compared to the unbroken cage.

Figure 6C:
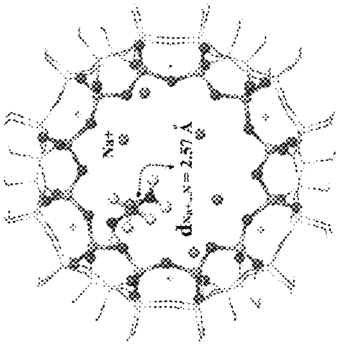
FIG. 6C depicts ethylenediamine inside a 12-member entrance window of a Faujasite supercage. The small, light-purple balls in the center of the 12-member ring represent Na cations.
Figure 6D:
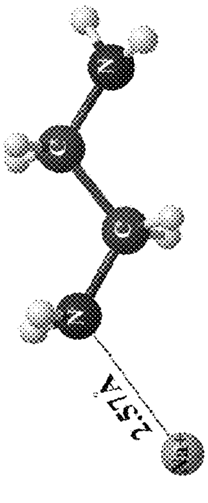
FIG. 6D depicts the interaction between an ethylenediamine molecule and a Na cation, isolated from the zeolite medium.

FIG. 6C simulates the presence of an ethylenediamine molecule in a supercage window consisting of a 12-member ring. The stabilization energy of one ethylenediamine molecule in this 12-member ring is −42.0 kcal/mol, which is more than that from an interaction with an exterior wall of a small cage (−32.0 kcal/mol) and less than that from an interaction with a broken small cage (−54.6 kcal/mol). The extensive space of a supercage window and the large number of Na cations in this space suggests that the individual molecules of ethylenediamine receive the electrostatic forces arising from the large number of Na cations before those of the side walls originating from Si and Al tetrahedrons. These extra-framework cations counterbalance the negative charges of the zeolite's framework generated due to the charge difference between $Si^{+4}$ and $Al^{+3}$ in zeolites containing aluminum. Isolated from the zeolite medium, DFT calculations show a good interaction between ethylenediamine (as a basic amine) and Na+ that is associated with a considerable stabilization energy, −62.6 kcal/mol, as depicted in FIG. 6D. The potential of amine molecules interacting with metals is corroborated by the corrosion inhibition of metals by aliphatic amines. The anti-corrosion properties of amine compounds are closely related to the formation of amine-metal coordination bonds followed by the adsorption of amine on the surface of the target metal. The hydrophobic film created significantly reduces the access of both water and aggressive ions to the protected surface.

Despite the electrostatic attractions between ethylenediamine and Na cations in open pores, the test results show that 48% of the ethylenediamine gradually releases into the bitumen matrix. This indicates that not all the ethylenediamine molecules take advantage of cation attractions in open pores, probably because of the improper orientations of amines and cations, an insufficient number of Na cations in pore spaces, or H-bonding interactions among ethylenediamine molecules. The type and the number of cations directly affect the accessible volume for incoming guest molecules: monovalent cations occupying every cationic site present a smaller pore volume compared to divalent cations occupying every other cationic position.

Without being bound by theory, it is possible that the zeolite's locations vacated by ethylenediamine are reloaded by some small organic compounds of bitumen. Another possibility may be that some polar molecules of bitumen are able to substitute for the ethylenediamine molecules, stimulating their release into the bitumen matrix. Based on the DFT results, the adsorption strength of ethylenediamine in a supercage-window space is less than that for incomplete sodalite cages. The weak adsorption sites for ethylenediamine could be potential targets for bitumen molecules. The DFT-based energies obtained for adsorption of ethylenediamine molecules on three adsorption sites shown in FIGS. 6A-6C are compared with the energies for adsorption of seven small polar molecules of bitumen shown in Table 1. There are three target adsorption sites: the {111} sodalite cage (top of the 6-ring window of the sodalite cage); the {100} sodalite cage (broken cage); and a 12-member entrance window of a Faujasite supercage.

Figure 7A:
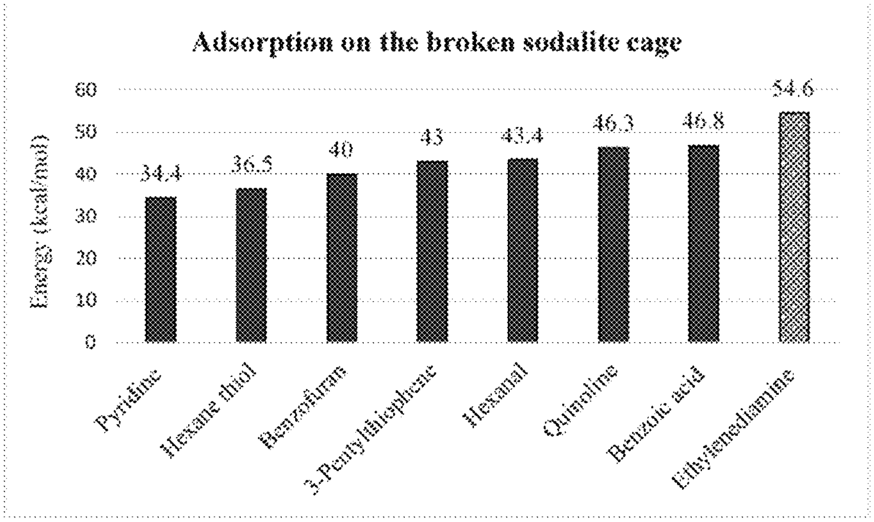
FIGS. 7A-7C are plots comparing the adsorption of ethylenediamine with seven small polar molecules of bitumen, in terms of energy (kcal/mol) on three adsorption sites of a Faujasite zeolite model: {100} sodalite cage (broken cage); {111} sodalite cage (top of the 6-ring window of the sodalite cage); and a 12-member supercage window, respectively.

Based on the DFT results, the incomplete sodalite cage with its H-bonding interactions (H—O . . . . N) on the broken edges depicted in FIG. 6B still has the most interaction with an ethylenediamine molecule ($E_{ads}$=−54.6 kcal/mol) compared to the seven polar compounds of bitumen shown in FIG. 7A. This indicates that the ethylenediamine molecules grafted on this active site are not easily substituted by incoming bitumen molecules and not easily discharged to the bitumen matrix.

Figure 7B:
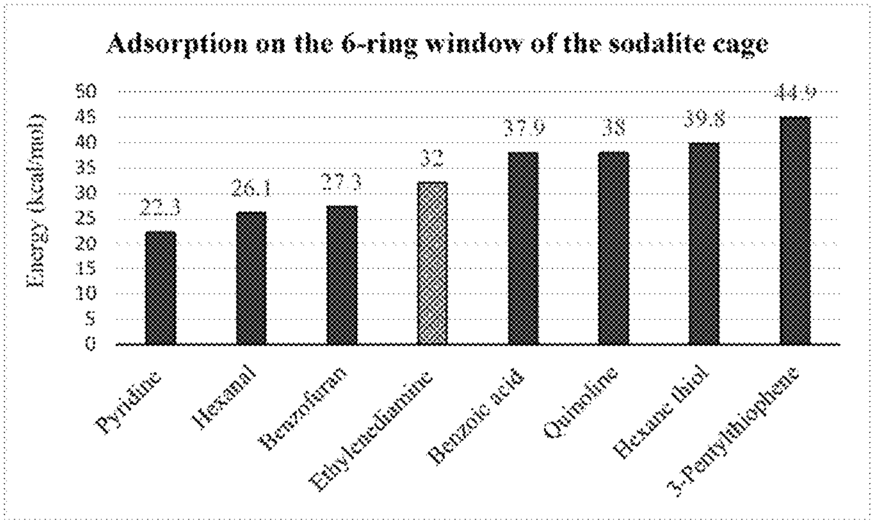

Compared to adsorption on the incomplete (broken) sodalite, an ethylenediamine molecule adsorbed on top of the 6-ring window of a complete sodalite cage depicted in FIG. 6A shows much less adsorption energy ($E_{ads}$=−32.0 kcal/mol). This indicates that the molecules adsorbed to the exterior walls of a sodalite cage are more susceptible to be removed and released into the medium. As shown in FIG. 7B, several polar organic compounds of bitumen (including benzoic acid, quinoline, hexanethiol, and 3-pentylthiophene) have greater adsorption energies compared to ethylenediamine and consequently could be potential candidates for substituting the locations of ethylenediamine.

Figure 8A:
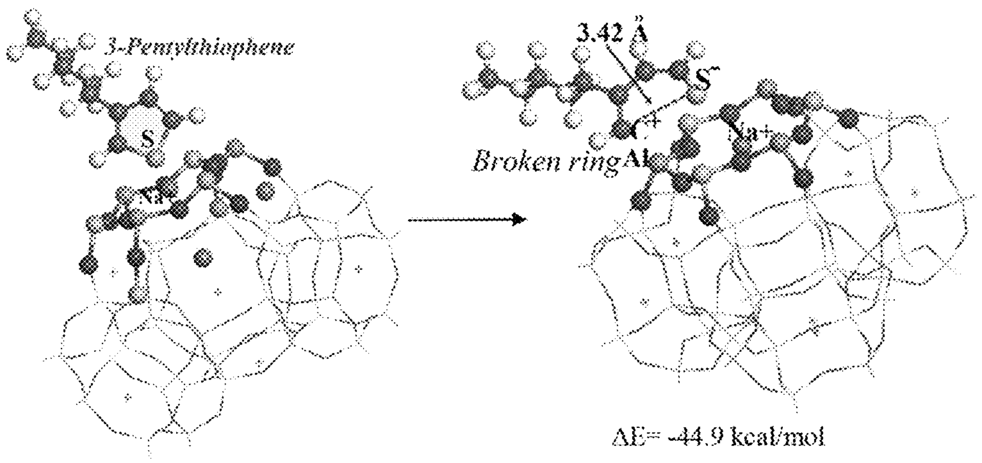
FIGS. 8A and 8B depict the breaking bonds and forming of new bonds in small organic compounds of bitumen in zeolite pores: ring-opening C—S bond cleavage of thiophene; and S—H bond cleavage and intermolecular H-transfer in hexanethiol on top of the 6-ring window of a sodalite cage, respectively.
Figure 8B:
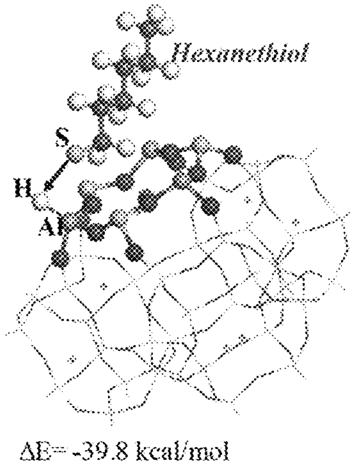

The DFT-based calculations show the breaking of covalent bonds and forming of new bonds in organic compounds of bitumen in interaction with the exterior walls of a sodalite cage, leading to the higher interaction energies for these typical molecules. Among the molecules involved in these chemical reactions are some S-containing compounds such as 3-pentylthiophene and hexanethiol depicted in FIGS. 8A and 8B. 3-pentylthiophene undergoes the opening of a thiophene ring followed by the C—S bond cleavage depicted in FIG. 8A, and hexanethiol undergoes an intermolecular H-transfer reaction followed by the S—H bond cleavage depicted in FIG. 8B.

Figure 7C:
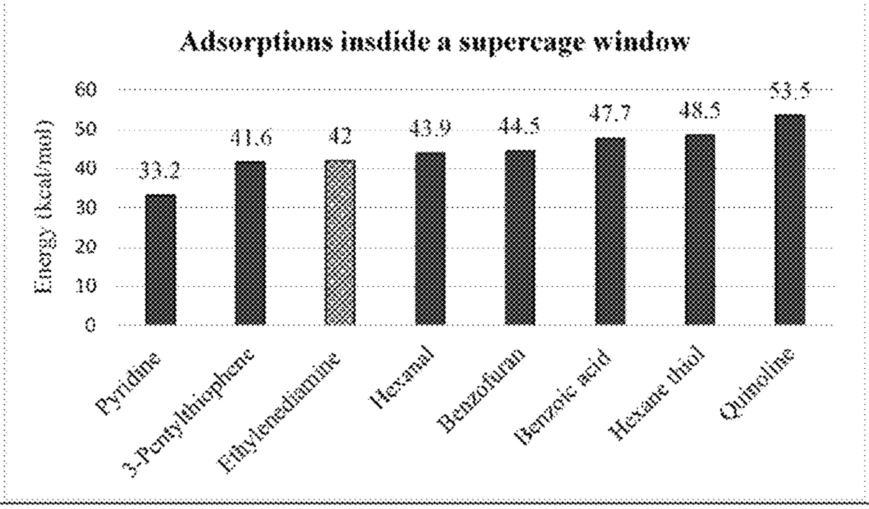

Interactions inside the supercage window are mainly related to the Na cations in this space. Adsorption of one ethylenediamine molecule in this space is associated with −42.0 kcal/mol stabilization energy, which is less than that in a broken cage depicted in FIG. 6C. Referring to FIG. 7C, the trend of energy for the other seven polar organic compounds in this space shows that at least five of them (benzoic acid, quinoline, hexanethiol, benzofuran, and hexanal) could replace the ethylenediamine molecule in this space because their adsorption strength is more than (or comparable with) that for an ethylenediamine molecule.

The results described here are based on one individual ethylenediamine molecule in this extensive space (a 12-ring entrance window of a cavity). In a real system, the large number of ethylenediamine molecules and the H-bonding interactions between each pair of ethylenediamine molecules boost their tendency to remain in this space (12-ring entrance window of a cavity). However, based on the MISTI results that indicate the release of 48% of the ethylenediamine molecules, the extensive spaces of cavities and their entrance windows with a limited number of Na cations are the most probable locations for releasing some of the ethylenediamine molecules.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A bitumen composite comprising:
an amine-impregnated zeolite comprising a zeolite impregnated with an amine; and
bitumen.

2. The bitumen composite of claim 1, wherein the bitumen composite comprises about 0.1 wt % to about 5 wt % of the amine.

3. The bitumen composite of claim 1, wherein a weight ratio of the amine to the zeolite is up to about 1.

4. The bitumen composite of claim 3, wherein the weight ratio is in a range of about 0.6 to 1.

5. The bitumen composite of claim 1, wherein the bitumen composite comprises up to 5 wt % of the zeolite.

6. The bitumen composite of claim 1, wherein the amine comprises ethylenediamine.

7. The bitumen composite of claim 1, wherein the zeolite comprises a natural or synthetic zeolite.

8. The bitumen composite of claim 7, wherein the zeolite comprises a Faujasite-type zeolite.

9. The bitumen composite of claim 1, further comprising an aggregate.

10. The bitumen composite of claim 9, wherein the aggregate comprises one or more of sand, crushed stone, gravel, and rock dust.

11. A method of forming a bitumen composite, the method comprising:
combining bitumen and an amine-impregnated zeolite to yield a mixture, wherein the amine-impregnated zeolite comprises a zeolite impregnated with an amine; and
heating the mixture to yield the bitumen composite.

12. The method of claim 11, wherein heating the mixture comprises heating the mixture to a temperature of about 100° C. to about 200° C.

13. The method of claim 11, wherein heating the mixture comprises heating the mixture for about 1 minute to about 100 minutes.

14. The method of claim 11, wherein the bitumen composite comprises about 0.1 wt % to about 5 wt % of the amine.

15. The method of claim 11, wherein a weight ratio of the amine to the zeolite is up to about 1.

16. The method of claim 15, wherein the weight ratio is in a range of about 0.6 to 1.

17. The method of claim 11, wherein the bitumen composite comprises up to 5 wt % of the zeolite.

18. The method of claim 11, wherein the amine comprises ethylenediamine.

19. The method of claim 11, wherein the zeolite comprises a natural or synthetic zeolite.

20. The method of claim 19, wherein the zeolite comprises a Faujasite-type zeolite.

21. The method of claim 11, further comprising combining the bitumen composite with an aggregate.

22. The method of claim 21, wherein the aggregate comprises one or more of sand, crushed stone, gravel, and rock dust.

23. A composition comprising:
the bitumen composite of claim 1.

* * * * *